US012705102B2

(12) United States Patent
Ma et al.

(10) Patent No.: US 12,705,102 B2
(45) Date of Patent: Aug. 11, 2026

(54) PARALLELISM WITH TASK DEPENDENCIES IN A CURATED EXPERIENCE

(71) Applicant: Salesforce, Inc., San Francisco, CA (US)

(72) Inventors: Billy Ma, San Francisco, CA (US); Anthony Lai, San Francisco, CA (US); Liang Xie, San Francisco, CA (US); Huiyuan Li, San Francisco, CA (US); Aaron Chan, San Francisco, CA (US); Pranit Shah, San Francisco, CA (US)

(73) Assignee: Salesforce, Inc.

( * ) Notice: Subject to any disclaimer, the term of this patent is extended or adjusted under 35 U.S.C. 154(b) by 596 days.

(21) Appl. No.: 18/185,262

(22) Filed: Mar. 16, 2023

(65) Prior Publication Data

US 2024/0311195 A1 Sep. 19, 2024

(51) Int. Cl.
*G06F 9/50* (2006.01)

(52) U.S. Cl.
CPC .... *G06F 9/5038* (2013.01); *G06F 2209/5017* (2013.01); *G06F 2209/5018* (2013.01)

(58) Field of Classification Search
CPC ........... G06F 9/5038; G06F 2209/5017; G06F 2209/5018
See application file for complete search history.

(56) References Cited

U.S. PATENT DOCUMENTS 5,428,780 A * 6/1995 England .............. G06F 9/44594 717/142
5,577,188 A 11/1996 Zhu
5,608,872 A 3/1997 Schwartz et al.
5,649,104 A 7/1997 Carleton et al.
5,715,450 A 2/1998 Ambrose et al.
5,761,419 A 6/1998 Schwartz et al.
(Continued)

FOREIGN PATENT DOCUMENTS

CN 113392132 A * 9/2021 ............. G06F 16/27

OTHER PUBLICATIONS

Liu, CN113392132A Description Translation, Sep. 14, 2021, <https://worldwide.espacenet.com/publicationDetails/description?CC=CN&NR=113392132A&KC=A&FT=D&ND=3&date=20210914&DB=&locale=en_EP> pp. 1-9 (Year: 2021).*

*Primary Examiner* — Aimee Li
*Assistant Examiner* — Hsing Chun Lin
(74) *Attorney, Agent, or Firm* — Ingrassia Fisher & Lorenz, LLP

(57) ABSTRACT

A method in a computing environment for application start up includes: generating a directed acyclic graph (DAG) for tasks that are performed during application start-up; performing topological sorting of the tasks based on the DAG to define an order for the tasks; allocating a tenant-specific priority queue; loading the tasks in the tenant-specific priority queue in the order determined by the topological sorting; allocating a plurality of computing threads to executing the tasks; executing the tasks using the plurality of computing threads that were allocated, wherein a plurality of the tasks are executed in parallel, and the tasks are assigned to the computing threads in an order based on the order in which the task are loaded in the tenant-specific priority queue; preparing a start page for use in accessing the application; and causing the start page to be displayed on a user access device for accessing the application.

20 Claims, 6 Drawing Sheets

(56) References Cited

U.S. PATENT DOCUMENTS 5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
6,295,530 B1 9/2001 Ritchie et al.
6,324,568 B1 11/2001 Diec et al.
6,324,693 B1 11/2001 Brodersen et al.
6,336,137 B1 1/2002 Lee et al.
D454,139 S 3/2002 Feldcamp et al.
6,367,077 B1 4/2002 Brodersen et al.
6,393,605 B1 5/2002 Loomans
6,405,220 B1 6/2002 Brodersen et al.
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans et al.
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,772,229 B1 8/2004 Achacoso et al.
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker
6,829,655 B1 12/2004 Huang et al.
6,842,748 B1 1/2005 Warner et al.
6,850,895 B2 2/2005 Brodersen et al.
6,850,949 B2 2/2005 Warner et al.
7,062,502 B1 6/2006 Kesler
7,069,231 B1 6/2006 Cinarkaya et al.
7,181,758 B1 2/2007 Chan
7,289,976 B2 10/2007 Kihneman et al.
7,340,411 B2 3/2008 Cook
7,356,482 B2 4/2008 Frankland et al.
7,401,094 B1 7/2008 Kesler
7,412,455 B2 8/2008 Dillon
7,508,789 B2 3/2009 Chan
7,620,655 B2 11/2009 Larsson et al.
7,698,160 B2 4/2010 Beaven et al.
7,730,478 B2 6/2010 Weissman
7,779,475 B2 8/2010 Jakobson et al.
8,014,943 B2 9/2011 Jakobson
8,015,495 B2 9/2011 Achacoso et al.
8,032,297 B2 10/2011 Jakobson
8,082,301 B2 12/2011 Ahlgren et al.
8,095,413 B1 1/2012 Beaven
8,095,594 B2 1/2012 Beaven et al.
8,209,308 B2 6/2012 Rueben et al.
8,275,836 B2 9/2012 Beaven et al.
8,457,545 B2 6/2013 Chan
8,484,111 B2 7/2013 Frankland et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,566,301 B2 10/2013 Rueben et al.
8,646,103 B2 2/2014 Jakobson et al.
11,175,950 B1 * 11/2021 Yang .................... G06F 9/5038
11,803,478 B1 * 10/2023 Gould ...................... G06F 8/38
2001/0044791 A1 11/2001 Richter et al.
2002/0072951 A1 6/2002 Lee et al.
2002/0082892 A1 6/2002 Raffel
2002/0129352 A1 9/2002 Brodersen et al.
2002/0140731 A1 10/2002 Subramanian et al.
2002/0143997 A1 10/2002 Huang et al.
2002/0162090 A1 10/2002 Parnell et al.
2002/0165742 A1 11/2002 Robbins
2003/0004971 A1 1/2003 Gong
2003/0018705 A1 1/2003 Chen et al.
2003/0018830 A1 1/2003 Chen et al.
2003/0066031 A1 4/2003 Laane et al.
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker et al.
2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2006/0021019 A1 1/2006 Hinton et al.
2008/0249972 A1 10/2008 Dillon
2009/0063414 A1 3/2009 White et al.
2009/0100342 A1 4/2009 Jakobson
2009/0177744 A1 7/2009 Marlow et al.
2011/0247051 A1 10/2011 Bulumulla et al.
2012/0042218 A1 2/2012 Cinarkaya et al.
2012/0066465 A1 * 3/2012 Rabeler .................. G06F 8/654
717/171
2012/0144039 A1 * 6/2012 Watson ................ G06F 9/5011
709/226
2012/0218958 A1 8/2012 Rangaiah
2012/0233137 A1 9/2012 Jakobson et al.
2013/0212497 A1 8/2013 Zelenko et al.
2013/0218948 A1 8/2013 Jakobson
2013/0218949 A1 8/2013 Jakobson
2013/0218966 A1 8/2013 Jakobson
2013/0247216 A1 9/2013 Cinarkaya et al.
2014/0013318 A1 * 1/2014 Rychikhin ............... G06F 8/65
717/172
2020/0012521 A1 * 1/2020 Wu ......................... G06N 3/04

(56) References Cited

U.S. PATENT DOCUMENTS

| | | | | |
|---|---|---|---|---|
| 2021/0303632 | A1* | 9/2021 | Parthasarathy | G06F 11/0754 |
| 2021/0334358 | A1* | 10/2021 | Medvinsky | G06F 21/645 |
| 2022/0391263 | A1* | 12/2022 | Che | G06F 9/52 |
| 2023/0370390 | A1* | 11/2023 | Balasubramanian | H04L 47/60 |
| 2025/0165760 | A1* | 5/2025 | He | G06N 3/049 |

* cited by examiner

PARALLELISM WITH TASK DEPENDENCIES IN A CURATED EXPERIENCE

TECHNICAL FIELD

Embodiments of the subject matter described herein relate to multi-tenant computing environments, and more particularly to application start-up in multi-tenant computing environments.

BACKGROUND

Application start-up can be a time consuming process in some computing environments. A user of the application can be made to wait for various start-up tasks to complete before being presented with a start page. A computing system that could speed up the application start-up process would be advantageous and could improve user experience with the application.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In some aspects, the techniques described herein relate to a method including: generating, for a first tenant, a directed acyclic graph (DAG) for tasks that are performed during application start-up for an application accessible via a multi-tenant computing environment that includes multiple computing threads; performing topological sorting of the tasks based on the DAG to define an order for the tasks; allocating from the multi-tenant computing environment a tenant-specific priority queue for the first tenant; loading the tasks in the tenant-specific priority queue in the order determined by the topological sorting of the tasks; allocating a plurality of computing threads from the multiple computing threads to executing the tasks; executing the tasks using the plurality of computing threads that were allocated, wherein a plurality of the tasks are executed in parallel, and the tasks are assigned to the computing threads in an order based on the order in which the task are loaded in the tenant-specific priority queue; preparing a start page for use in accessing the application; and causing the start page to be displayed on a user access device for accessing the application.

In some aspects, the techniques described herein relate to a multi-tenant computing environment configured to provide an application for use by a first tenant, the multi-tenant computing environment includes: a multi-tenant database for storing tenant data for a plurality of tenants for use with the application; and a server including one or more processors that provide multiple computing threads for use in application startup and an application startup controller; wherein the application startup controller is configured to: generate, for a first tenant, a directed acyclic graph (DAG) for tasks that are performed during application start-up for an application accessible via a multi-tenant computing environment that includes multiple computing threads; perform topological sorting of the tasks based on the DAG to define an order for the tasks; allocate from the multi-tenant computing environment a tenant-specific priority queue for the first tenant; load the tasks in the tenant-specific priority queue in the order determined by the topological sorting of the tasks; allocate a plurality of computing threads from the multiple computing threads to executing the tasks; cause the plurality of computing threads that were allocated to execute the tasks, wherein a plurality of the tasks are executed in parallel, and the tasks are assigned to the computing threads in an order based on the order in which the task are loaded in the tenant-specific priority queue; cause a start page for use in accessing the application to be prepared; and cause the start page to be displayed on a user access device for accessing the application.

In some aspects, the techniques described herein relate to a method including a registration phase, a build-time phase, and a run-time phase, wherein the registration phase occurs when a tenant organization registers for access to the application, the build-time phase occurs before a user-request to access the application, and the run-time phase occurs after a user-request to access the application, the method including: generating, for a first tenant during the registration phase, a directed acyclic graph (DAG) for tasks that are performed during application start-up for an application accessible via a multi-tenant computing environment that includes multiple computing threads; performing topological sorting of the tasks based on the DAG to define an order for the tasks; allocating from the multi-tenant computing environment a tenant-specific priority queue for the first tenant; loading the tasks in the tenant-specific priority queue in the order determined by the topological sorting of the tasks; allocating a plurality of computing threads from the multiple computing threads to executing the tasks; executing the tasks using the plurality of computing threads that were allocated, wherein a plurality of the tasks are executed in parallel and the tasks are assigned to the computing threads in an order based on the order in which the task are loaded in the tenant-specific priority queue; preparing a start page for use in accessing the application; and causing the start page to be displayed on a user access device for accessing the application.

Furthermore, other desirable features and characteristics will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the words "exemplary" and "example" mean "serving as an example, instance, or illustration." Thus, any embodiment described herein as "exemplary" or "example" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
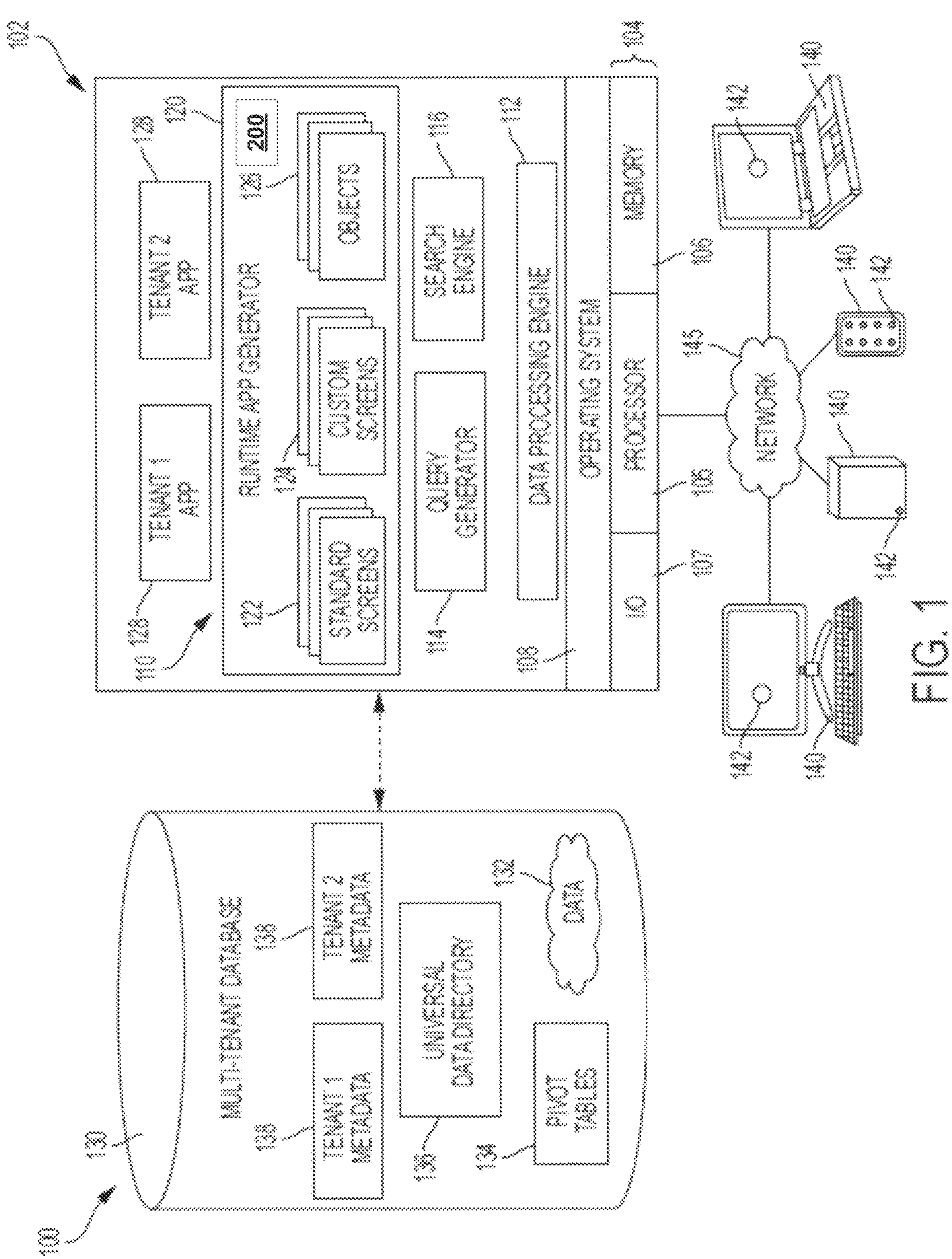
FIG. 1 is a schematic block diagram of an example multi-tenant computing environment in which features of the disclosed embodiments can be implemented in accordance with some of the disclosed embodiments.

FIG. 1 is a schematic block diagram of an example multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database system 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Objects, Records, and Archive Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project.

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g., fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying to work on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

In various embodiments, the runtime application generator 120 is enhanced to include an application startup controller 200 to improve the speed at which Tenant applications 128 load. The application startup controller 200 allows the runtime application generator 120 to take advantage of multiple processor execution threads and parallel processing to speed up application loading.

Figures 2, 3:
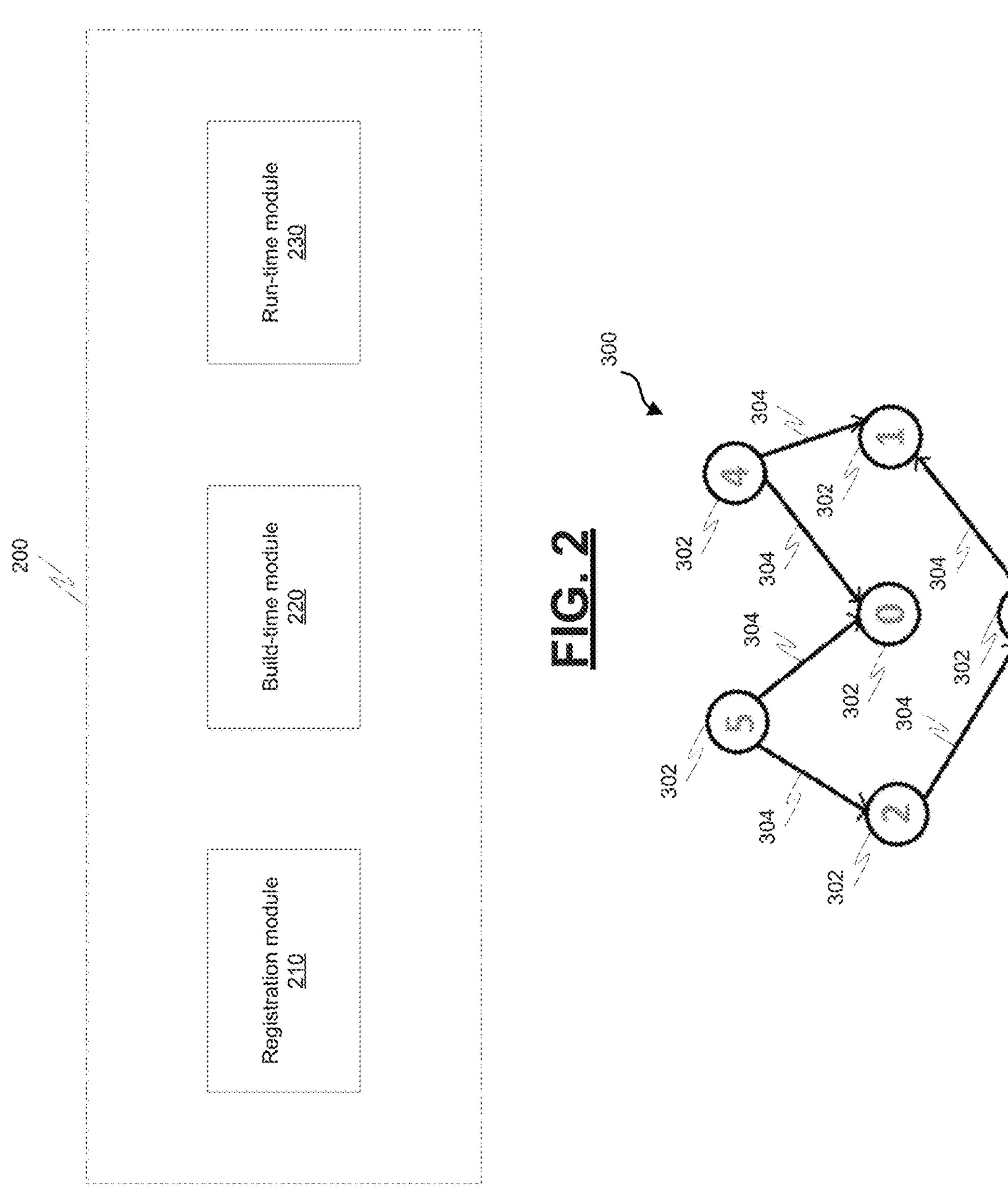
FIG. 2 is a block diagram of an example application startup controller, in accordance with various embodiments.
FIG. 3 is a block diagram depicting an example directed acyclic graph (DAG), in accordance with various embodiments.

FIG. 2 is a block diagram of an example application startup controller 200, in accordance with various embodiments. The application startup controller 200 includes at least one processor and computer readable storage media and is configured by programming instructions on the computer readable storage media. The example application startup controller 200 includes a registration module 210, a build-time module 220, and a run-time module 230.

After a tenant signs up for an application, the registration module 210 takes preparatory actions to allow the application startup controller 200 to utilize parallel processing to speed up application loading. The actions taken by the registration module 210 include writing the application code. Writing the application code includes selecting an application plan (wherein a plan includes a series of jobs to be executed to achieve a certain goal, such as, setting up an organization or tenant for a specific application edition before putting the organization into use), identifying the jobs to be performed in providing the application (wherein a job includes a series of tasks), and identifying the tasks within the jobs (wherein a task can have action parameters and is the basic execution unit in a plan). After writing the application code, the registration module 210 is configured to save the application code to memory and set a thread limit on the number of threads that may be allocated to a tenant during application loading.

The build-time module 220 takes actions, before a startup request is received by a tenant, to make the application ready for execution. The actions taken by the build-time module 220 includes compiling the application code that was saved by the registration module 210. Compiling the application code includes generating a directed acyclic graph (DAG) for the tasks that are performed during application loading.

A directed acyclic graph (DAG) is a conceptual representation of a series of tasks. The order of the tasks is depicted by a graph, which is visually presented as a set of circles, each one representing a task, some of which are connected by lines, which represent the flow from one task to another. FIG. 3 is a block diagram depicting an example DAG 300, in accordance with various embodiments. The example DAG includes six circles (numbered 0-5). Each circle 302 is known as a "vertex" and each line 304 connected to a circle 302 is known as an "edge." The "Directed" in the DAG 300 refers to each edge 304 having a defined direction, so each edge 304 necessarily represents a single directional flow from one vertex 302 to another. "Acyclic" in the DAG 300 identifies that there are no loops (i.e., "cycles") in the graph, so that for any given vertex 302, if you follow an edge 304 that connects that vertex 302 to another, there is no path in the graph to get back to that initial vertex 302.

In various embodiments, compiling the application code further includes sorting the tasks in the DAG in a topological order. In various embodiments the sorting the tasks in a topological order is performed by an algorithm such as Khan's BFS based algorithm, although other algorithms may be applied to sort the tasks in a topological order.

After the tasks are sorted in a topological order, loop detection operations occur (i.e., checking for loops). If no loops are detected during loop detection operations, the topological ordering is successful. When sorting is performed by a Khan's BFS based algorithm, loop detection operations can be performed as part of performing the algorithm. After successfully sorting the tasks in a topological order and performing loop detection, the build-time module 220 is configured to store the order for the tasks determined by the sorting. In this example, topological ordering and loop detection is performed by the build-time module. In other examples, the topological ordering and loop detection may be performed by the run-time module.

The run-time module 230 is configured to cause a plurality of execution threads that are allocated for application startup to execute the startup tasks in parallel. This leads to improved application startup performance. The run-time module 230 is configured to prepare a tenant-specific priority queue for use in setting the order in which startup tasks are performed during application startup, load the tenant-specific priority queue with the stored ordering of tasks in the order determined through the topological ordering of the tasks, and cause the execution threads to select tasks for execution from the tenant-specific priority queue. The tenant-specific priority queue allows tasks to be executed in parallel by the plurality of execution threads, ensures that the execution threads perform tasks in an order that will yield gains in application startup speed, and guards against tasks being executed out of order. The number of threads that are used for startup are limited by the thread limit for the tenant.

Each thread, when it is the thread's turn to select a task, selects the first task from the tenant-specific priority queue that is ready for execution. This allows multiple tasks to be performed in parallel by the plurality of threads thereby speeding up application loading.

Figure 4:
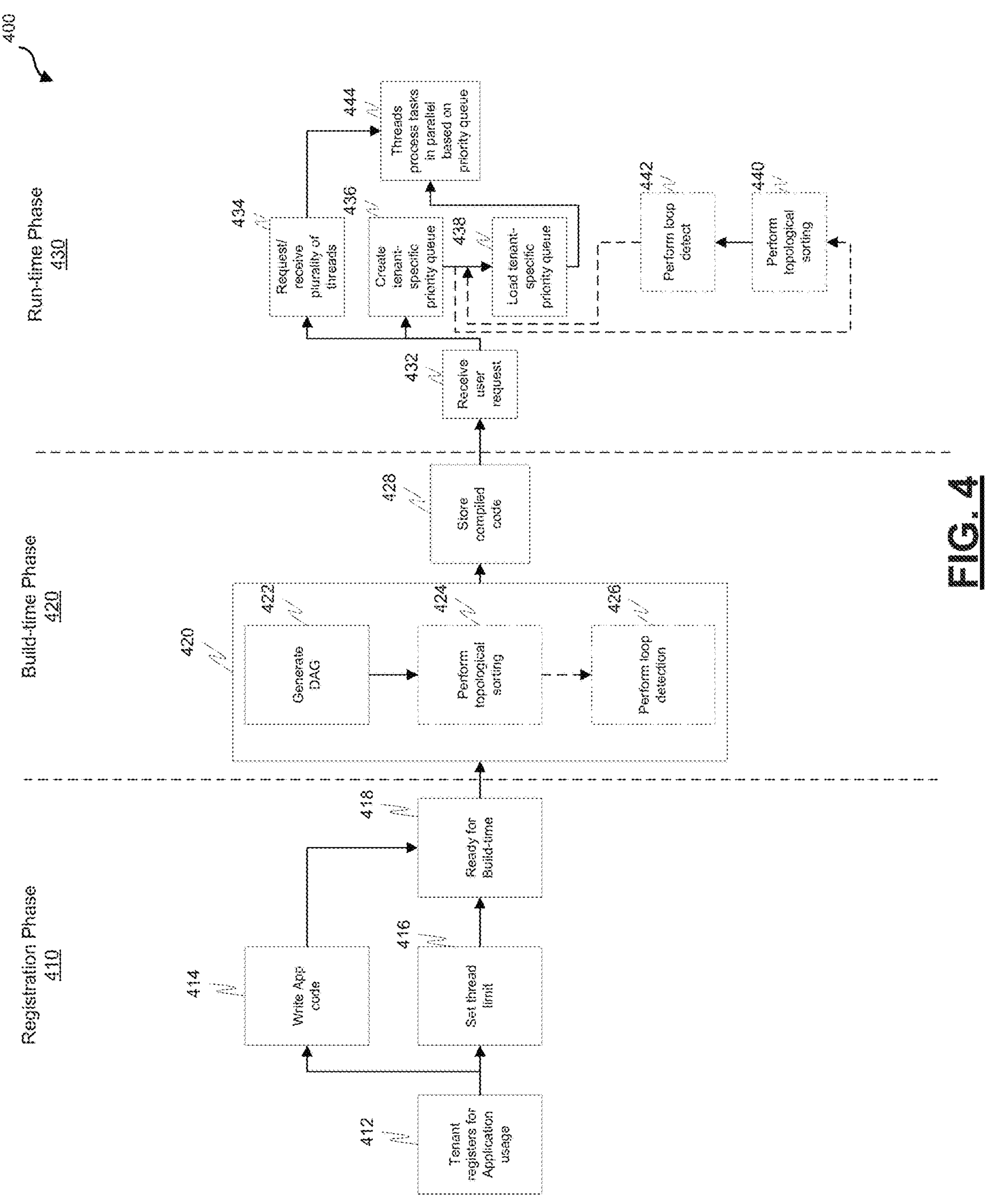
FIG. 4 is a process flow chart depicting an example process for decreasing application startup time, in accordance with various embodiments.

FIG. 4 is a process flow chart depicting an example process 400 for decreasing application startup time, in accordance with various embodiments. The order of operation within the example process 400 is not limited to the sequential execution as illustrated in the figure, but may be performed in one or more varying orders as applicable and in accordance with the present disclosure. The example process 400 includes a registration phase 410, a build-time phase 420, and a run-time phase 430.

At operation 412, in the registration phase 410, a representative of a tenant organization registers for application usage within the multi-tenant computing environment. Registration may include completing a survey or questionnaire listing all of the application features to which the tenant organization is subscribing to and identifying tenant data to use with the application.

At operation 414, the example process 400 includes writing and saving application code for providing use of the application to a tenant. In various embodiments, writing the application code includes selecting an application plan, identifying the jobs to be performed in providing the application, and identifying the tasks within the jobs.

At operation 416, the example process 400 includes setting a thread limit on the number of threads that may be allocated to a tenant for use during application loading. Operations 414 and 416 may be performed in varying orders, serially, and/or in parallel.

At operation 418, after operations 414 and 416 are complete, the multi-tenant computing environment is ready for the build-time phase.

At operation 420, the example process 400 includes compiling the application code. Compiling the application code includes generating a DAG (at operation 422), and optionally includes performing topological sorting of the tasks in the DAG (at operation 424) and performing loop detection based on the topological sorting (at operation 426). Topological sorting may be performed by a sorting algorithm such as a Khan's BFS based Algorithm, depth-first search, or a parallel sorting algorithm.

In an example use of a Kahn's algorithm, the sorting algorithm repeatedly: (a) finds nodes with no incoming edge, that is, nodes with zero indegree (no dependency); (b) stores the nodes with zero indegree in a stack/queue and deletes the nodes with zero indegree from the original graph; and (c) deletes the edges originating from the nodes stored in step b thereby decrementing the indegree of each node connected to the nodes removed in step b. This process (steps a-c) repeats until no element with zero indegree can be found. This can occur when the topological sorting is complete or when a cycle is encountered (indicating a loop).

In an example use of a Kahn's algorithm, the algorithm further includes performing loop detection. With the algorithm, a check is made to determine if the performance of topological sorting results in the same number of nodes as in the DAG. If the numbers match, no cycle was encountered and the original graph was indeed Acyclic. If the numbers do not match, a cycle was encountered, which means the topological sorting was not possible.

At operation 428, the example process 400 includes storing the compiled code, and the multi-tenant computing environment is ready for parallel execution of the startup tasks using multiple processing threads in parallel during the Run-time phase 430.

The Run-time phase 430 begins when a user request for the application is received (operation 432). After receiving a user request for the application at operation 432, the example process 400 includes, at operation 434, requesting the allocation of a plurality of execution threads for executing the application startup tasks. The number of execution threads that are allocated are limited by the thread limit for the tenant organization.

At operation 436, the example process 400 includes generating a tenant-specific priority queue for the tenant organization and, at operation 438, loading the tenant-specific queue with the task ordering determined from a topological sorting of tasks in the DAG. When the topological sorting is not performed in the Build-time phase (e.g., at operations 424 and 426), the example process 400 includes topological sorting of the tasks in the DAG (at operation 440) and performing loop detection based on the topological sorting (at operation 442).

At operation 444, the example process 400 includes processing the plurality of startup tasks in parallel using a plurality of processing threads, for example, from a thread pool executor. In various embodiments the thread pool executor can make a plurality of threads, up to the maximum allocated to a tenant, available for use for startup operations. The thread pool executor dispatches the plurality of thread, one after another, until all allocated threads are dispatched or while there are tasks ready for execution. When a thread completes a task, it becomes available to the thread pool executor for dispatching on another task execution.

Figure 5:
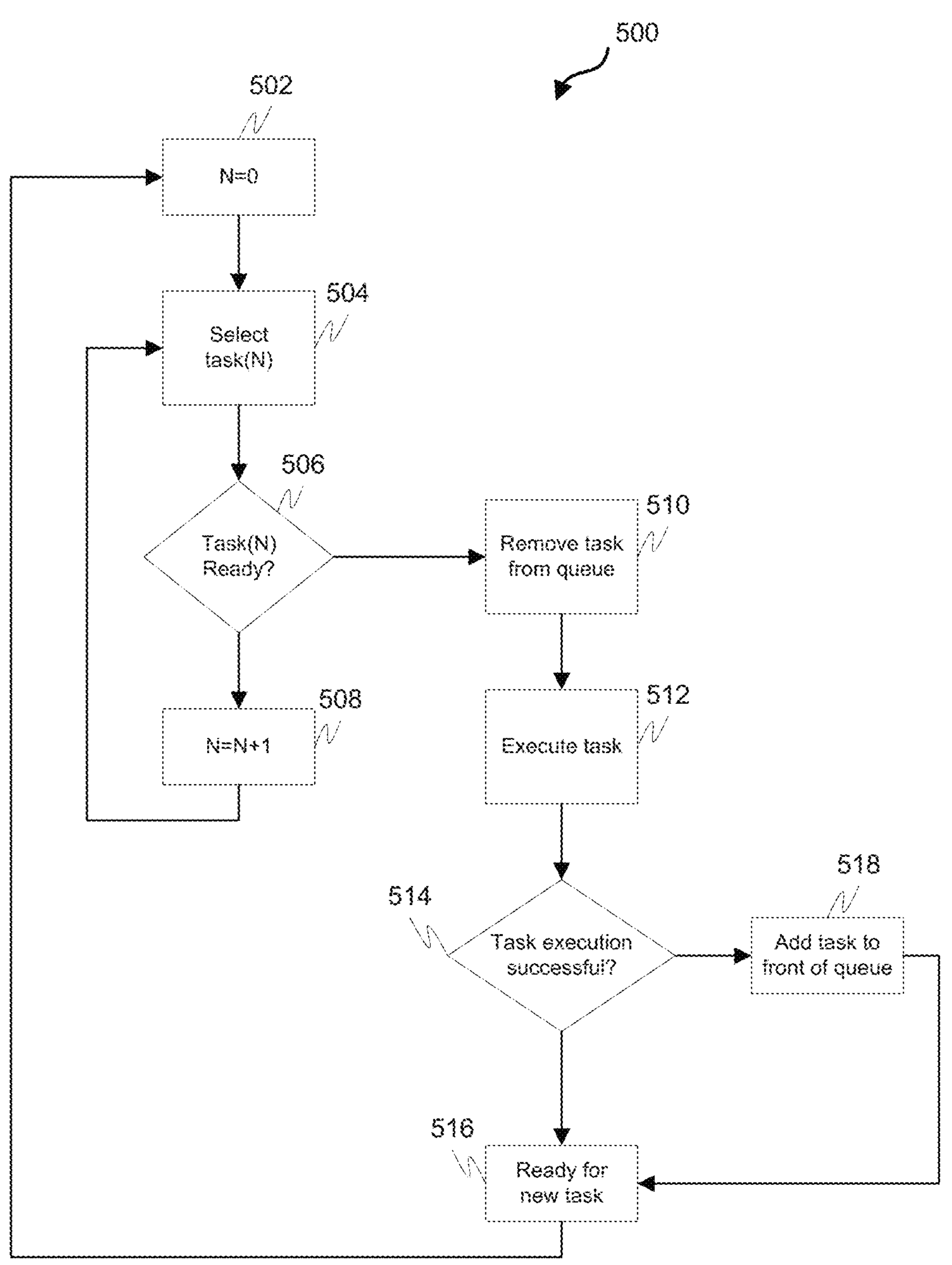
FIG. 5 is a process flow chart depicting an example process for an executing thread when processing a startup task, in accordance with various embodiments.

FIG. 5 is a process flow chart depicting an example process 500 for an executing thread when processing a startup task, in accordance with various embodiments.

At operation 502, the example process 500 includes initializing an index variable (e.g., setting N=0).

At operation 504, the example process 500 includes selecting the first task in the priority queue (e.g., selecting task (N))

At operation 506, the example process 500 includes determining if the first task in the priority queue is ready for execution (e.g., determining if task (N) is ready for execution). Determining if a task is ready for execution includes determining if any task dependencies must be performed before the task can be performed.

Figures 6, 7:
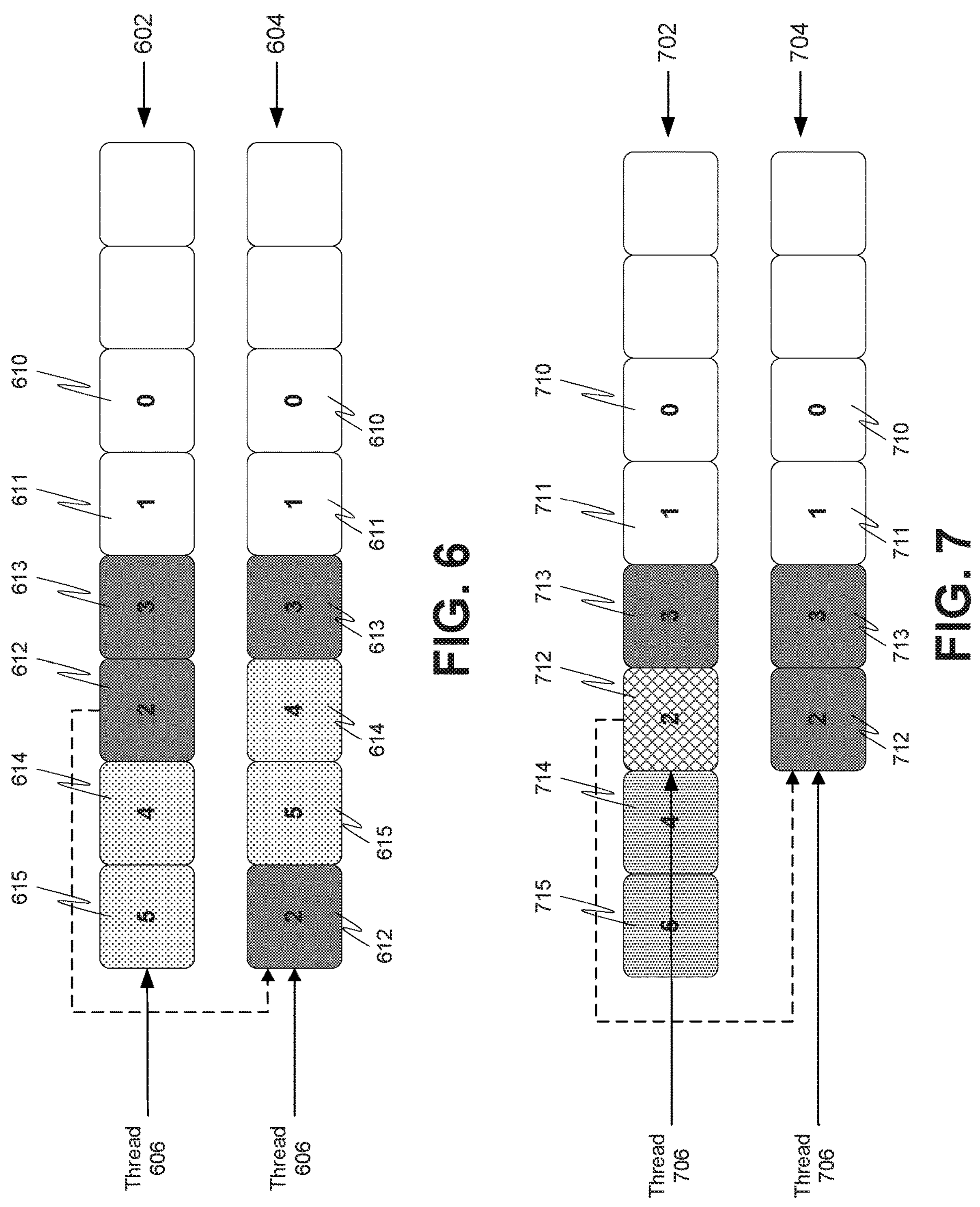
FIG. 6 is a block diagram depicting an example priority queue state when a thread is ready for task execution and an example priority queue state after the thread has checked the ready state on the up-front tasks, in accordance with various embodiments.
FIG. 7 is a block diagram depicting an example priority queue state before task execution by a thread and an example priority queue state after task execution by the thread has failed, in accordance with various embodiments.

FIG. 6 is a block diagram depicting an example priority queue state 602 when a thread 606 is ready for task execution and an example priority queue state 604 after the thread 606 has checked the ready state on the up-front tasks, in accordance with various embodiments. The example priority queue state 602 includes six tasks (tasks 615, 614, 612, 613, 611, 610), with task 615 as the up-front task to execute. In this example, tasks 615 and 614 are not ready for execution by a new thread. Tasks 615 and 614 are in progress or have a condition-not-met (e.g., task on which it is dependent has not completed) and therefore are not ready for execution by a new thread. When the thread 606 selects a task for execution, task 612 is moved to the up-front task for execution ahead of tasks 615 and 614 as depicted in the priority queue state 604 because tasks 615 and 614 are not ready for execution. A subsequent executing thread may select task 615 or 614 after task 612 has been selected for execution because tasks 615 and 614 remain in front of other tasks in the queue, if one of task 615 or 614 is ready for execution at the time the subsequent thread is ready for a task. The thread 606 picks up the up-front task to execute. If for a chosen task, the task is in an in-progress state or in a condition-not-met state, the thread 606 picks up the next task.

Referring back to FIG. 5, if the first task (e.g., task (N)) is not ready, the example process 500 includes incrementing the index variable (e.g., N=N+1) at operation 508 and selecting the next task in the priority queue at operation 504.

If the first task (e.g., task (N)) is ready, the example process 500 includes removing the task from the priority queue at operation 510 and executing the task at operation 512.

At operation 514, the example process 500 includes determining if task execution was successful. If task execution was successful, the example process 500 includes notifying the thread pool executor that the thread is available for executing a new task at operation 516.

If task execution was not successful, the example process 500 includes adding the failed task to the front of the priority queue at operation 518 and notifying the thread pool executor that the thread is available for executing a new task at operation 516. In various embodiments, task execution is retried up to 3 times in case of failed task execution.

FIG. 7 is a block diagram depicting an example priority queue state 702 before task execution by a thread 706 and an example priority queue state 704 after task execution by the thread 706 has failed, in accordance with various embodiments. The example priority queue state 702 includes six tasks (tasks 715, 714, 712, 713, 711, 710), with task 715 as the up-front task to execute. In this example, tasks 715 and 714 are not ready for execution by a new thread. Tasks 715 and 714 are in an in progress state or have in a condition-not-met state (e.g., task on which it is dependent has not completed) and therefore are not ready for execution by a new thread. As a result, the thread 706 selects task 712 for execution. After it is determined that execution of task 712 has failed, task 712 is returned to the priority queue to the up-front position for execution ahead of remaining tasks 713, 711, and 710 for execution as depicted in the priority queue state 704. The next executing thread can select task 712 for immediate execution. In various embodiments, up to three retries may be attempted when a task fails execution.

Figure 8:
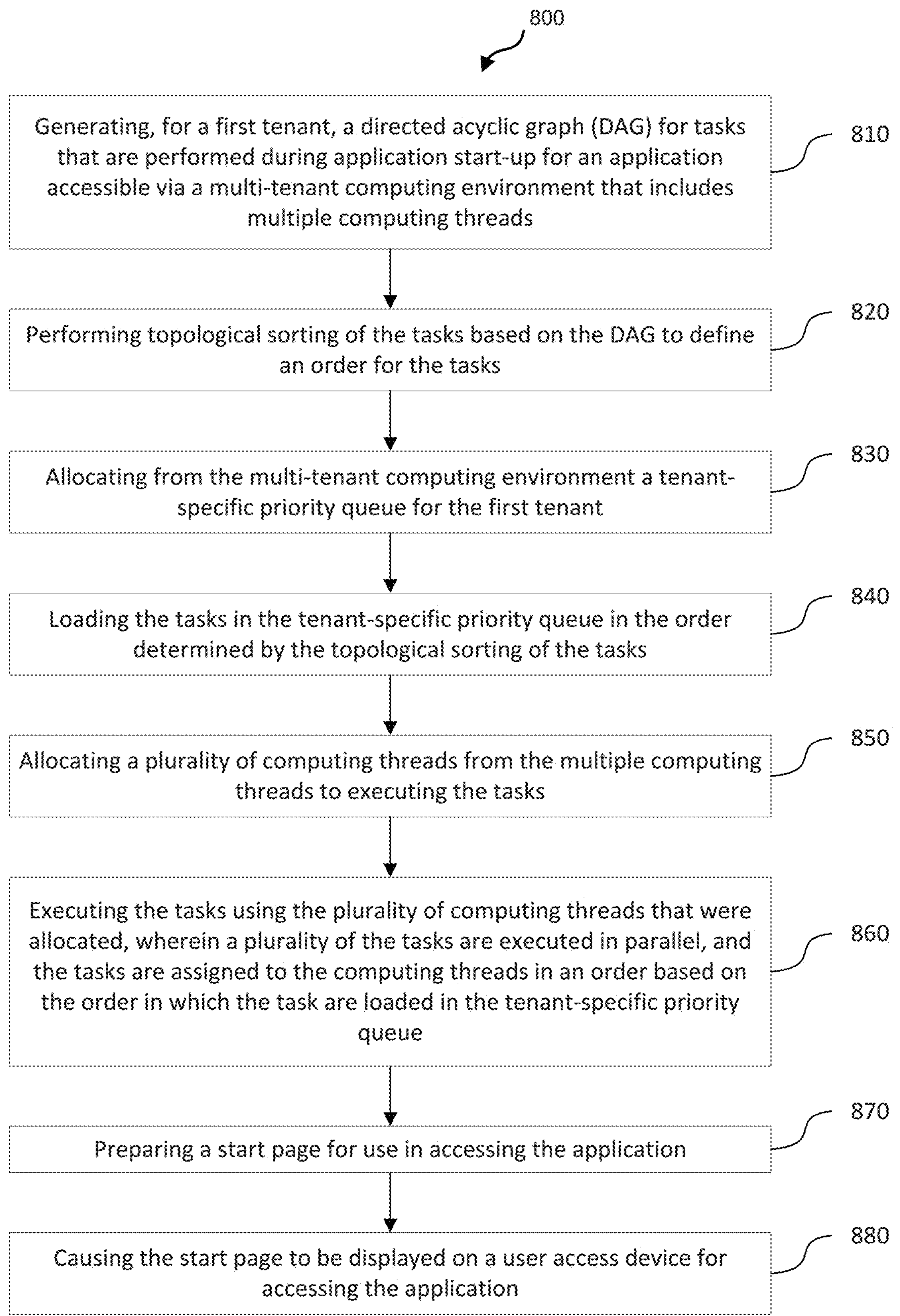
FIG. 8 is a flowchart of an example method in a multi-tenant computing environment, in accordance with various embodiments.

FIG. 8 is a flowchart of an example method 800 in a multi-tenant computing environment, in accordance with various embodiments. The order of operation within the example method 800 is not limited to the sequential execution as illustrated in the figure, but may be performed in one or more varying orders as applicable and in accordance with the present disclosure.

At step 810, the method 800 includes generating, for a first tenant, a directed acyclic graph (DAG) for tasks that are performed during application start-up for an application accessible via a multi-tenant computing environment that includes multiple computing threads. In various embodiments, the method includes a registration phase, followed by a build-time phase, and followed by a run-time phase wherein the registration phase occurs a tenant organization registers for access to the application, the build-time phase occurs before a user-request to access the application, the run-time phase occurs after a user-request to access the application, and the generating the DAG occurs during the build-time phase.

At step 820, the method 800 includes performing topological sorting of the tasks based on the DAG to define an order for the tasks. In various embodiments, the performing topological sorting of the tasks based on the DAG to define an order for the tasks occurs during the build-time phase. In various embodiments, the performing topological sorting of the tasks based on the DAG to define an order for the tasks occurs during the run-time phase. In various embodiments, the method 800 further includes performing loop detection during the build-time phase. In various embodiments, the method 800 further includes performing loop detection during the run-time phase.

In various embodiments, performing topological sorting of the tasks comprises performing topological sorting using a Khan's BFS based algorithm. In various embodiments, performing topological sorting of the tasks comprises: (a) identifying nodes of the DAG with zero indegree; (b) storing the nodes with zero indegree in a stack and deleting the stored nodes from the DAG; (c) deleting edges originating from the nodes stored in (b); and (d) repeating (a) through (c) until no nodes with zero indegree are left in the DAG.

At step 830, the method 800 includes allocating from the multi-tenant computing environment a tenant-specific priority queue for the first tenant. At step 840, the method 800 includes loading the tasks in the tenant-specific priority queue in the order determined by the topological sorting of the tasks. In various embodiments, loading the tasks in the tenant-specific priority queue in the order determined by the topological sorting of the tasks occurs during the run-time phase. In various embodiments, loading the tasks in the tenant-specific priority queue in the order determined by the topological sorting of the tasks comprises storing tasks in the priority queue in an order corresponding to the order in which nodes corresponding to the tasks are stored in the stack.

At step 850, the method 800 includes allocating a plurality of computing threads from the multiple computing threads to executing the tasks. In various embodiments, the allocating a plurality of computing threads includes allocating a plurality of computing threads up to a thread limit for the first tenant. In various embodiments, the allocating a plurality of computing threads from the multiple computing threads to executing the tasks comprises: allocating a first thread to executing a task, continuously allocating another thread to executing a different task after a prior thread begins executing a task until each of the plurality of threads has been allocated to executing a task or there are no tasks available for executing, and allocating a same or new thread for task execution upon successful or failed completion of a task.

At step 860, the method 800 includes executing the tasks using the plurality of computing threads that were allocated, wherein a plurality of the tasks are executed in parallel, and the tasks are assigned to the computing threads in an order based on the order in which the task are loaded in the tenant-specific priority queue. In various embodiments, the executing the tasks using the plurality of computing threads that were allocated comprises for each thread: selecting the first task in the priority queue for execution; determining if the first task is ready for execution; if ready, executing the first task and removing the first task from priority queue so that there is a new first task in the priority queue; and if not ready: selecting a next task in the priority queue for execution, determining if the next task is ready for execution, executing the next task if ready for execution, and repeating the selecting the next task and the determining if ready until a task is selected that is ready for execution. In various embodiments, the executing the tasks using the plurality of computing threads that were allocated comprises for each thread: determining if task execution failure occurred, and returning a failed task to a front of the priority queue for execution by a computing thread when task execution failure occurred with the failed task. In various embodiments, the method further includes re-executing the failed task up to three times.

At step 870, the method 800 includes preparing a start page for use in accessing the application. At step 880, the method 800 includes causing the start page to be displayed on a user access device for accessing the application.

In some aspects, the techniques described herein relate to a method including: generating, for a first tenant, a directed acyclic graph (DAG) for tasks that are performed during application start-up for an application accessible via a multi-tenant computing environment that includes multiple computing threads; performing topological sorting of the tasks based on the DAG to define an order for the tasks; allocating from the multi-tenant computing environment a tenant-specific priority queue for the first tenant; loading the tasks in the tenant-specific priority queue in the order determined by the topological sorting of the tasks; allocating a plurality of computing threads from the multiple computing threads to executing the tasks; executing the tasks using the plurality of computing threads that were allocated, wherein a plurality of the tasks are executed in parallel, and the tasks are assigned to the computing threads in an order based on the order in which the task are loaded in the tenant-specific priority queue; preparing a start page for use in accessing the application; and causing the start page to be displayed on a user access device for accessing the application.

In some aspects, the techniques described herein relate to a method, including a registration phase, followed by a build-time phase, and followed by a run-time phase, wherein: the registration phase occurs a tenant organization registers for access to the application; the build-time phase occurs before a user-request to access the application; and the run-time phase occurs after a user-request to access the application; and the generating the DAG occurs during the build-time phase.

In some aspects, the techniques described herein relate to a method, wherein the performing topological sorting of the tasks based on the DAG to define an order for the tasks occurs during the build-time phase.

In some aspects, the techniques described herein relate to a method, wherein the performing topological sorting of the tasks based on the DAG to define an order for the tasks occurs during the run-time phase.

In some aspects, the techniques described herein relate to a method, further including performing loop detection during the build-time phase.

In some aspects, the techniques described herein relate to a method, further including performing loop detection during the run-time phase.

In some aspects, the techniques described herein relate to a method, wherein the allocating a plurality of computing threads includes allocating a plurality of computing threads up to the thread limit for the first tenant.

In some aspects, the techniques described herein relate to a method, wherein loading the tasks in the tenant-specific priority queue in the order determined by the topological sorting of the tasks occurs during the run-time phase.

In some aspects, the techniques described herein relate to a method, wherein the performing topological sorting of the tasks includes performing topological sorting using a Khan's BFS based algorithm.

In some aspects, the techniques described herein relate to a method, wherein the performing topological sorting of the tasks includes: (a) identifying nodes of the DAG with zero indegree; (b) storing the nodes with zero indegree in a stack and deleting the stored nodes from the DAG; (c) deleting edges originating from the nodes stored in (b); and (d) repeating (a) through (c) until no nodes with zero indegree are left in the DAG.

In some aspects, the techniques described herein relate to a method, wherein the loading the tasks in the tenant-specific priority queue in the order determined by the topological sorting of the tasks includes storing tasks in the priority queue in an order corresponding to the order in which nodes corresponding to the tasks are stored in the stack.

In some aspects, the techniques described herein relate to a method, wherein the allocating a plurality of computing threads from the multiple computing threads to executing the tasks includes: allocating a first thread to executing a task; continuously allocating another thread to executing a different task after a prior thread begins executing a task until each of the plurality of threads has been allocated to executing a task or there are no tasks available for executing; and allocating a same or new thread for task execution upon successful or failed completion of a task.

In some aspects, the techniques described herein relate to a method, wherein the executing the tasks using the plurality of computing threads that were allocated includes for each thread: selecting the first task in the priority queue for execution; determining if the first task is ready for execution; if ready, executing the first task and removing the first task from priority queue so that there is a new first task in the priority queue; and if not ready: selecting a next task in the priority queue for execution, determining if the next task is ready for execution, executing the next task if ready for execution, and repeating the selecting the next task and the determining if ready until a task is selected that is ready for execution.

In some aspects, the techniques described herein relate to a method, wherein the executing the tasks using the plurality of computing threads that were allocated includes for each thread: determining if task execution failure occurred; and returning a failed task to a front of the priority queue for execution by a computing thread when task execution failure occurred with the failed task.

In some aspects, the techniques described herein relate to a method, further including re-executing the failed task up to three times.

In some aspects, the techniques described herein relate to a multi-tenant computing environment configured to provide an application for use by a first tenant, the multi-tenant computing environment includes: a multi-tenant database for storing tenant data for a plurality of tenants for use with the application; and a server including one or more processors that provide multiple computing threads for use in application startup and an application startup controller; wherein the application startup controller is configured to: generate, for a first tenant, a directed acyclic graph (DAG) for tasks that are performed during application start-up for an application accessible via a multi-tenant computing environment that includes multiple computing threads; perform topological sorting of the tasks based on the DAG to define an order for the tasks; allocate from the multi-tenant computing environment a tenant-specific priority queue for the first tenant; load the tasks in the tenant-specific priority queue in the order determined by the topological sorting of the tasks; allocate a plurality of computing threads from the multiple computing threads to executing the tasks; cause the plurality of computing threads that were allocated to execute the tasks, wherein a plurality of the tasks are executed in parallel, and the tasks are assigned to the computing threads in an order based on the order in which the task are loaded in the tenant-specific priority queue; cause a start page for use in accessing the application to be prepared; and cause the start page to be displayed on a user access device for accessing the application.

In some aspects, the techniques described herein relate to a multi-tenant computing environment, wherein to execute the tasks, each computing thread: selects the first task in the priority queue for execution; determines if the first task is ready for execution; if ready, executes the first task and removes the first task from priority queue so that there is a new first task in the priority queue; and if not ready: selects a next task in the priority queue for execution, determines if the next task is ready for execution, executes the next task if ready for execution, and repeats selecting the next task and determining if ready until a task is selected that is ready for execution.

In some aspects, the techniques described herein relate to a multi-tenant computing environment, wherein to execute the tasks, each computing thread: determines if task execution failure occurred; and returns a failed task to a front of the priority queue for execution by a computing thread when task execution failure occurred with the failed task.

In some aspects, the techniques described herein relate to a method including a registration phase, a build-time phase, and a run-time phase, wherein the registration phase occurs when a tenant organization registers for access to the application, the build-time phase occurs before a user-request to access the application, and the run-time phase occurs after a user-request to access the application, the method including: generating, for a first tenant during the registration phase, a directed acyclic graph (DAG) for tasks that are performed during application start-up for an application accessible via a multi-tenant computing environment that includes multiple computing threads; performing topological sorting of the tasks based on the DAG to define an order for the tasks; allocating from the multi-tenant computing environment a tenant-specific priority queue for the first tenant; loading the tasks in the tenant-specific priority queue in the order determined by the topological sorting of the tasks; allocating a plurality of computing threads from the multiple computing threads to executing the tasks; executing the tasks using the plurality of computing threads that were allocated, wherein a plurality of the tasks are executed in parallel and the tasks are assigned to the computing threads in an order based on the order in which the task are loaded in the tenant-specific priority queue; preparing a start page for use in accessing the application; and causing the start page to be displayed on a user access device for accessing the application.

In some aspects, the techniques described herein relate to a method, wherein the performing topological sorting of the tasks includes: (a) identifying nodes of the DAG with zero indegree; (b) storing the nodes with zero indegree in a stack and deleting the stored nodes from the DAG; (c) deleting edges originating from the nodes stored in (b); and (d) repeating (a) through (c) until no nodes with zero indegree are left in the DAG.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word “exemplary” or “example” means “serving as an example, instance, or illustration.” Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms “first,” “second” and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method comprising:

writing application code to utilize parallel processing to speed up application loading at application start-up for an application accessible via a multi-tenant computing environment that includes multiple computing threads, wherein writing the application code comprises selecting an application plan for the application loading at the application start-up, wherein selecting the application plan comprises identifying a plurality of jobs to be executed to load the application at the application start-up and identifying a plurality of tasks within each of the plurality of jobs;

generating, for a first tenant, a directed acyclic graph (DAG) for the plurality of tasks to be executed to load the application at the application start-up, wherein the DAG comprises a plurality of nodes, wherein each of the plurality of nodes corresponds to a task of the plurality of tasks to be executed to load the application at the application start-up;

performing topological sorting of the plurality of tasks to be executed to load the application at the application start-up based on the DAG to define an order for the plurality of tasks, wherein performing the topological sorting of the plurality of tasks to be executed to load the application at the application start-up comprises:

(a) identifying a node of the DAG with zero indegree, wherein the identified node corresponds to a unique task of the plurality of tasks to be executed to load the application at the application start-up;

(b) storing the unique task of the plurality of tasks to be executed to load the application at the application start-up corresponding to the node with zero indegree in a stack and deleting the node with zero indegree from the DAG;

(c) deleting edges originating from the node with zero indegree from the DAG; and (d) repeating operations (a) through (c) until no nodes with zero indegree are left in the DAG;

allocating from the multi-tenant computing environment a tenant-specific priority queue for the first tenant;

loading the plurality of tasks to be executed to load the application at the application start-up in the tenant-specific priority queue in the order determined by the topological sorting of the plurality of tasks to be executed to load the application at the application start-up;

allocating a plurality of computing threads from the multiple computing threads to execute the plurality of tasks;

executing the plurality of tasks using the plurality of computing threads that were allocated, wherein multiple tasks of the plurality of tasks are executed in parallel, and the plurality of tasks are assigned to the plurality of computing threads in an order based on the order in which the plurality of tasks are loaded in the tenant-specific priority queue;

preparing a start page for use in accessing the application; and causing the start page to be displayed on a user access device for accessing the application.

2. The method of claim 1, comprising a registration phase, followed by a build-time phase, and followed by a run-time phase, wherein:

the registration phase occurs when a tenant organization registers for access to the application;

the build-time phase occurs before a user-request to access the application;

the run-time phase occurs after a user-request to access the application; and the generating the DAG occurs during the build-time phase.

3. The method of claim 2, wherein the performing topological sorting of the plurality of tasks based on the DAG to define the order for the plurality of tasks occurs during the build-time phase.

4. The method of claim 2, wherein the performing topological sorting of the plurality of tasks based on the DAG to define the order for the plurality of tasks occurs during the run-time phase.

5. The method of claim 2, further comprising performing loop detection during the build-time phase.

6. The method of claim 2, further comprising performing loop detection during the run-time phase.

7. The method of claim 1, wherein the allocating the plurality of computing threads comprises allocating the plurality of computing threads up to a thread limit for the first tenant.

8. The method of claim 1, wherein loading the plurality of tasks in the tenant-specific priority queue in the order determined by the topological sorting of the plurality of tasks occurs during a run-time phase.

9. The method of claim 1, wherein the performing topological sorting of the plurality of tasks comprises performing topological sorting using a Khan's BFS based algorithm.

10. The method of claim 1, wherein the allocating the plurality of computing threads from the multiple computing threads to execute the plurality of tasks comprises:

allocating a first computing thread of the plurality of computing threads to execute a first task;

continuously allocating another computing thread of the plurality of computing threads to execute a different task after a prior computing thread begins executing one of the plurality of tasks until each of the plurality of computing threads has been allocated to execute one of the plurality of tasks or there are no tasks available for executing; and allocating a same or new computing thread for task execution upon successful or failed completion of one of the plurality of tasks.

11. The method of claim 1, wherein the executing the plurality of tasks using the plurality of computing threads that were allocated comprises for each computing thread of the plurality of computing threads:

selecting a first task in the tenant-specific priority queue for execution;

determining if the first task is ready for execution;

if ready, executing the first task and removing the first task from the tenant-specific priority queue so that there is a new first task in the tenant-specific priority queue; and if not ready: selecting a next task in the tenant-specific priority queue for execution, determining if the next task is ready for execution, and if the next task is ready for execution, executing the next task and removing the next task from the tenant-specific priority queue, and if the next task is not ready for execution, repeatedly selecting a new next task in the tenant-specific priority queue and determining if ready until a task is selected that is ready for execution.

12. The method of claim 11, wherein the executing the plurality of tasks using the plurality of computing threads that were allocated comprises for each computing thread of the plurality of computing threads:

determining if task execution failure occurred; and returning a failed task to a front of the tenant-specific priority queue for execution by a computing thread of the plurality of computing threads when task execution failure occurred with the failed task.

13. The method of claim 12, further comprising re-executing the failed task up to three times.

14. A multi-tenant computing environment configured to provide an application for use by a first tenant, the multi-tenant computing environment comprises:

a multi-tenant database for storing tenant data for a plurality of tenants for use with the application; and a server comprising one or more processors that provide multiple computing threads for use in application start-up and an application startup controller;

wherein the application startup controller is configured to:

write application code to utilize parallel processing to speed up application loading at the application start-up for the application, wherein writing the application code comprises selecting an application plan for the application loading at the application start-up, wherein selecting the application plan comprises identifying a plurality of jobs to be executed to load the application at the application start-up and identifying a plurality of tasks within each of the plurality of jobs;

generate, for a first tenant, a directed acyclic graph (DAG) for the plurality of tasks to be executed to load the application at the application start-up, wherein the DAG comprises a plurality of nodes, wherein each of the plurality of nodes corresponds to a task of the plurality of tasks to be executed to load the application at the application start-up;

perform topological sorting of the plurality of tasks to be executed to load the application at the application start-up based on the DAG to define an order for the plurality of tasks, wherein to perform the topological sorting of the plurality of tasks to be executed to load the application at the application start-up the application startup controller is configured to:

(a) identify a node of the DAG with zero indegree, wherein the identified node corresponds to a unique task of the plurality of tasks to be executed to load the application at the application start-up;

(b) store the unique task of the plurality of tasks to be executed to load the application at the application start-up corresponding to the node with zero indegree in a stack and delete the node with zero indegree from the DAG;

(c) delete edges originating from the node with zero indegree from the DAG; and (d) repeat operations (a) through (c) until no nodes with zero indegree are left in the DAG;

allocate from the multi-tenant computing environment a tenant-specific priority queue for the first tenant;

load the plurality of tasks to be executed to load the application at the application start-up in the tenant-specific priority queue in the order determined by the topological sorting of the plurality of tasks to be executed to load the application at the application start-up;

allocate a plurality of computing threads from the multiple computing threads to execute the plurality of tasks;

cause the plurality of computing threads that were allocated to execute the plurality of tasks, wherein multiple tasks of the plurality of tasks are executed in parallel, and the plurality of tasks are assigned to the plurality of computing threads in an order based on the order in which the plurality of tasks are loaded in the tenant-specific priority queue;

cause a start page for use in accessing the application to be prepared; and cause the start page to be displayed on a user access device for accessing the application.

15. The multi-tenant computing environment of claim 14, wherein to execute the plurality of tasks, each computing thread of the plurality of computing threads:

selects a first task in the tenant-specific priority queue for execution;

determines if the first task is ready for execution;

if ready, executes the first task and removes the first task from tenant-specific priority queue so that there is a new first task in the tenant-specific priority queue; and if not ready: selects a next task in the tenant-specific priority queue for execution, determines if the next task is ready for execution, and if the next task is ready for execution, executing the next task and removing the next task from the tenant-specific priority queue, and if the next task is not ready for execution, repeatedly selecting a new next task in the tenant-specific priority queue and determining if ready until a task is selected that is ready for execution.

16. The multi-tenant computing environment of claim 14, wherein to execute the plurality of tasks, each computing thread of the plurality of computing threads:

determines if task execution failure occurred; and returns a failed task to a front of the tenant-specific priority queue for execution by a computing thread of the plurality of computing threads when task execution failure occurred with the failed task.

17. A method comprising a registration phase, a build-time phase, and a run-time phase, wherein the registration phase occurs when a tenant organization registers for access to an application, the build-time phase occurs before a user-request to access the application, and the run-time phase occurs after the user-request to access the application, the method comprising:

writing application code to utilize parallel processing to speed up application loading at application start-up for the application accessible via a multi-tenant computing environment that includes multiple computing threads, wherein writing the application code comprises selecting an application plan for the application loading at the application start-up, wherein selecting the application plan comprises identifying a plurality of jobs to be executed to load the application at the application start-up and identifying a plurality of tasks within each of the plurality of jobs;

generating, for a first tenant during the registration phase, a directed acyclic graph (DAG) for the plurality of tasks to be executed to load the application at the application start-up, wherein the DAG comprises a plurality of nodes, wherein each of the plurality of nodes corresponds to a task of the plurality of tasks to be executed to load the application at the application start-up;

performing topological sorting of the plurality of tasks to be executed to load the application at the application start-up based on the DAG to define an order for the plurality of tasks, wherein performing the topological sorting of the plurality of tasks to be executed to load the application at the application start-up comprises:

(a) identifying a node of the DAG with zero indegree, wherein the identified node corresponds to a unique task of the plurality of tasks to be executed to load the application at the application start-up;

(b) storing the unique task of the plurality of tasks to be executed to load the application at the application start-up corresponding to the node with zero indegree in a stack and deleting the node with zero indegree from the DAG;

(c) deleting edges originating from the node with zero indegree from the DAG; and (d) repeating operations (a) through (c) until no nodes with zero indegree are left in the DAG;

allocating from the multi-tenant computing environment a tenant-specific priority queue for the first tenant;

loading the plurality of tasks to be executed to load the application at the application start-up in the tenant-specific priority queue in the order determined by the topological sorting of the plurality of tasks to be executed to load the application at the application start-up;

allocating a plurality of computing threads from the multiple computing threads to execute the plurality of tasks;

executing the plurality of tasks using the plurality of computing threads that were allocated, wherein multiple tasks of the plurality of tasks are executed in parallel, and the plurality of tasks are assigned to the plurality of computing threads in an order based on the order in which the plurality of tasks are loaded in the tenant-specific priority queue;

preparing a start page for use in accessing the application; and causing the start page to be displayed on a user access device for accessing the application.

18. The method of claim 17, further comprising performing loop detection during the build-time phase.

19. The method of claim 17, further comprising performing loop detection during the run-time phase.

20. The method of claim 17, wherein the executing the plurality of tasks using the plurality of computing threads that were allocated comprises for each computing thread of the plurality of computing threads:

selecting a first task in the tenant-specific priority queue for execution;

determining if the first task is ready for execution;

if ready, executing the first task and removing the first task from the tenant-specific priority queue so that there is a new first task in the tenant-specific priority queue; and if not ready: selecting a next task in the tenant-specific priority queue for execution, determining if the next task is ready for execution, and if the next task is ready for execution, executing the next task and removing the next task from the tenant-specific priority queue, and if the next task is not ready for execution, repeatedly selecting a new next task in the tenant-specific priority queue and determining if ready until a task is selected that is ready for execution.

* * * * *